US010229184B2

United States Patent
English et al.

(10) Patent No.: US 10,229,184 B2
(45) Date of Patent: *Mar. 12, 2019

(54) PHENOMENOLOGICAL SEMANTIC DISTANCE FROM LATENT DIRICHLET ALLOCATIONS (LDA) CLASSIFICATION

(71) Applicant: International Business Machines Corporation, Armonk, NY (US)

(72) Inventors: Jennifer A. English, Redwood City, CA (US); Malous M. Kossarian, Redwood City, CA (US); Charles E. McManis, Jr., Sunnyvale, CA (US); Douglas A. Smith, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/225,445

(22) Filed: Aug. 1, 2016

(65) Prior Publication Data

US 2018/0032600 A1    Feb. 1, 2018

(51) Int. Cl.
*G06F 17/30*    (2006.01)

(52) U.S. Cl.
CPC .. *G06F 17/30598* (2013.01); *G06F 17/30011* (2013.01)

(58) Field of Classification Search
CPC ............ G06F 17/2785; G06F 17/30011; G06F 17/30705; G06F 17/3053; G06F 17/30598
USPC ....................................................... 707/739
See application file for complete search history.

(56) References Cited

U.S. PATENT DOCUMENTS

| | | | |
|---|---|---|---|
| 7,089,592 B2 | 8/2006 | Adjaoute | |
| 7,653,530 B2 | 1/2010 | Carter et al. | |
| 9,026,518 B2 | 5/2015 | Rhinelander et al. | |
| 9,043,247 B1 | 5/2015 | Hart et al. | |
| 9,135,242 B1 | 9/2015 | Wang et al. | |
| 9,323,838 B2 | 4/2016 | Sun et al. | |
| 9,767,165 B1 * | 9/2017 | Tacchi | G06F 17/30719 |
| 2004/0088157 A1 | 5/2004 | Lach et al. | |
| 2004/0162806 A1 * | 8/2004 | Liu | G06F 17/2211 |

(Continued)

FOREIGN PATENT DOCUMENTS

CN    102760149 B    10/2012

OTHER PUBLICATIONS

Seaghdha, D.O. (2011). Distributional approaches to semantic analysis.: See pp. 93-95.

(Continued)

*Primary Examiner* — Thanh-Ha Dang
(74) *Attorney, Agent, or Firm* — Pepper Hamilton LLP

(57) ABSTRACT

Embodiments provide a system and method for semantic distance calculation. The method can involve ingesting a plurality of documents; extracting a set of subjects from the plurality of documents using latent dirichlet allocation; for each document in the plurality of documents, generating a classification list comprising a ranking of the one or more subjects based on the relevance of each subject to the document; for each classification list, calculating the semantic distance between each subject present on the classification list; aggregating the plurality of classification lists; and creating a distance matrix containing the relative semantic distances between each member of the set of subjects.

15 Claims, 4 Drawing Sheets

(56) References Cited

U.S. PATENT DOCUMENTS

| | | | |
|---|---|---|---|
| 2009/0077126 A1* | 3/2009 | Li | G06Q 30/02 |
| 2010/0153318 A1 | 6/2010 | Branavan et al. | |
| 2012/0150844 A1 | 6/2012 | Lindahl et al. | |
| 2012/0203752 A1* | 8/2012 | Ha-Thuc | G06F 17/30705 707/706 |
| 2012/0296637 A1* | 11/2012 | Smiley | G06F 17/2785 704/9 |
| 2013/0273976 A1* | 10/2013 | Rao | H04L 12/1822 455/563 |
| 2014/0173425 A1 | 6/2014 | Hailpern et al. | |
| 2014/0278379 A1* | 9/2014 | Coccaro | G10L 15/1822 704/202 |
| 2016/0012019 A1* | 1/2016 | Bagwell | G06F 17/218 707/738 |
| 2016/0103932 A1* | 4/2016 | Sathish | G06F 17/30705 715/767 |
| 2016/0253679 A1* | 9/2016 | Venkatraman | G06Q 30/0185 705/310 |
| 2017/0032251 A1* | 2/2017 | Podgorny | G06N 5/022 |
| 2017/0164011 A1* | 6/2017 | Rimon | H04N 21/232 |
| 2017/0192959 A1* | 7/2017 | Lee | G06F 17/30 |
| 2018/0004726 A1* | 1/2018 | Liu | G06F 17/3061 |

OTHER PUBLICATIONS

Non-Final Office Action dated Jul. 3, 2018 in corresponding U.S. Appl. No. 15/225,458.

Bhattacharya, I., & Sil, J. (2016). Query Classification using LDA Topic Model and Sparse Representation Based Classifier. In Proceedings of the 3rd IKDD Conference on Data Science, 24.

Qin, Z., Thint, M., & Huang, Z. (2009). Ranking answers by hierarchical topic models. In Next-Generation Applied Intelligence, 103-112.

Lee, S., Baker, J., Song, J., & Wetherbe, J. C. (2010). An empirical comparison of four text mining methods. In System Sciences (HICSS), 2010 43rd Hawaii International Conference, 1-10.

Seaghdha, D.O. (2011). Distributional approaches to semantic analysis., HIT-MSRA Summer Workshop on Human Language Technology, 58-103.

* cited by examiner

PHENOMENOLOGICAL SEMANTIC DISTANCE FROM LATENT DIRICHLET ALLOCATIONS (LDA) CLASSIFICATION

TECHNICAL FIELD

The present application relates generally to a system and method that can be used to classify and cluster subjects based on their relationships with other subjects.

BACKGROUND

There are many applications for learning from unstructured natural language. However, the rapid increase in data production creates difficulties in understanding such a large amount of data. Previous attempts have been made to classify the number of subject matters that exist on the internet, with one such attempt classifying over 2000 different subjects, including general categories like history, cars, travel, and hotels, to much more specific subjects like renaissance dance or bed bugs.

It would be useful to have the ability to calculate semantic distances between these subjects in order to determine whether subjects are "close" to any given subject, and provide a quantitative measurement of that closeness. Such a measurement can be used to provide further information during a query about a particular subject by collecting information from the related subjects, or to find subject clusters within a pre-determined list of all subjects.

SUMMARY

Embodiments can provide a computer implemented method in a data processing system comprising a processor and a memory comprising instructions, which are executed by the processor to cause the processor to implement a system for calculating semantic distances between subjects, the method comprising ingesting a plurality of documents; extracting a set of subjects from the plurality of documents using latent dirichlet allocation; for each document in the plurality of documents, generating a classification list comprising a ranking of the one or more subjects based on the relevance of each subject to the document; for each classification list, calculating the semantic distance between each subject present on the classification list; aggregating the plurality of classification lists; and creating a distance matrix containing the relative semantic distances between each member of the set of subjects.

Embodiments can further provide a method further comprising applying a natural language processing technique to the plurality of documents.

Embodiments can further provide a method further comprising excluding one or more subjects from the classification list if the subjects fail to reach a predetermined relevance threshold.

Embodiments can further provide a method further comprising for each classification list, normalizing a relevance value for each subject on the list based on a primary subject.

Embodiments can further provide a method further comprising for each subject, extrapolating the subject into one or more topic vectors; and calculating the relevance of a subject through analyzing the one or more topic vectors against the plurality of documents.

Embodiments can further provide a method further comprising disregarding one or more distance matrix elements if the elements do not appear in a predetermined threshold amount of documents contained in the plurality of documents.

Embodiments can further provide a method further comprising randomizing the order of the plurality of documents prior to ingestion.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a semantic distance calculation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
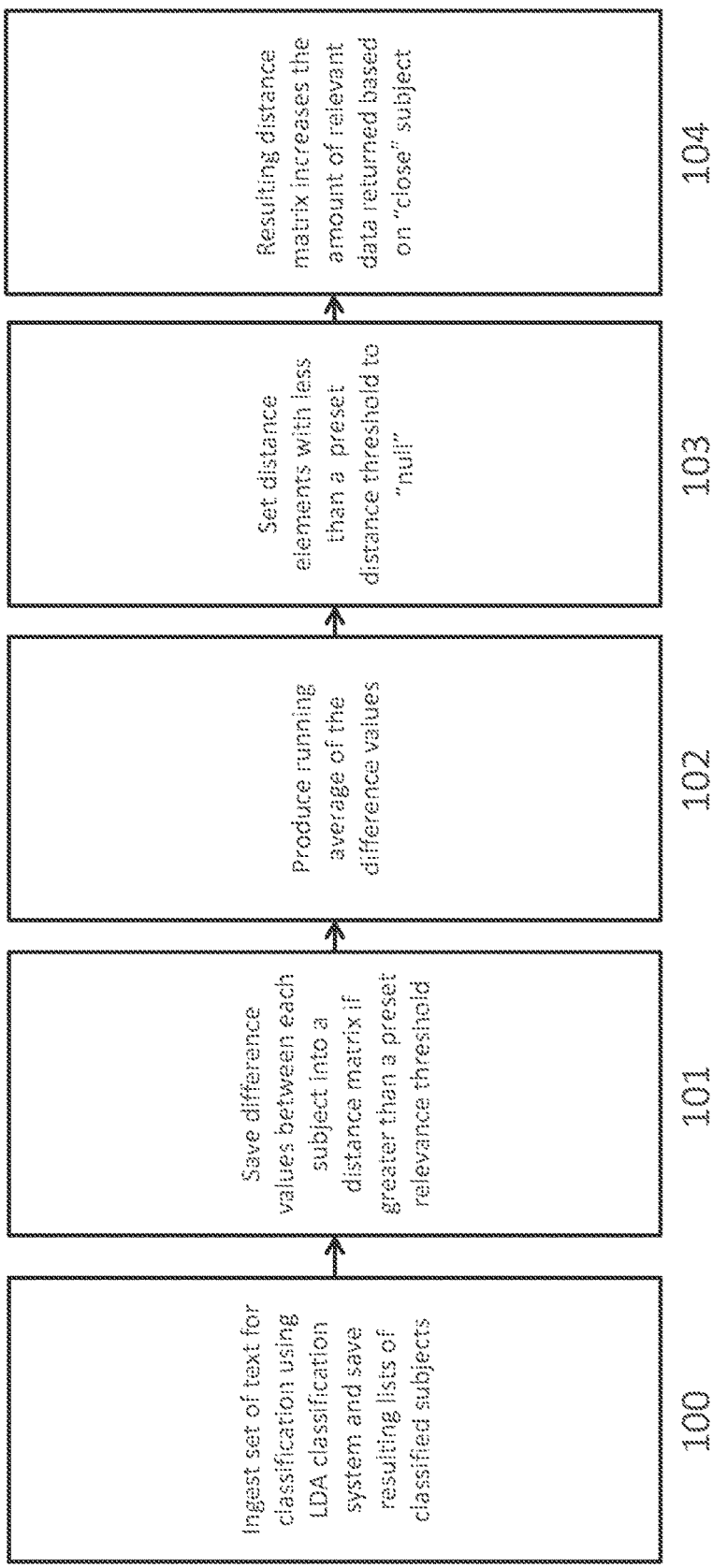
FIG. 1 illustrates a block diagram of the functionality of one illustrative embodiment of a semantic distance calculation system.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The subject semantic distance calculation system can be used to determine the "closeness" of subject areas relative to each other. By calculating the semantic proximity of various subjects, search algorithms and result returns based on the same can be more accurately produced by providing answers from "close" subjects, or by finding relational subject clusters within a flat list of a given area of subjects.

FIG. 1 depicts a block diagram illustrating the functionality of a subject semantic distance calculation system, according to embodiments described herein. First, the system can ingest a set of text for classification using a LDA classification system and save the resulting lists of classified subjects 100. A large plurality of documents can be ingested into the system, where each of the plurality of documents contains textual data relating to one or more predetermined subjects. In one embodiment, one or more of the plurality of documents may include web page content. For example, one or more of the plurality of documents may include all or a portion of a web page. In another embodiment, one or more of the plurality of documents may be created by crawling the Internet (e.g., using one or more web crawlers, spiders, indexers, etc.) and extracting text from results of such crawling.

Additionally, in one embodiment, one or more of the plurality of documents may include scanned content. For example, one or more of the plurality of documents may include all or a portion of a scanned document. In another example, optical character recognition may be performed on the scanned document in order to extract and obtain the textual data from the scanned document. In another embodiment, the textual data may include alphanumerical data. For example, the textual data may include one or more words, sentences, paragraphs, numbers, tables, etc.

Further, in one embodiment, the predetermined subject may include one or more terms that identify common subject matter shared by each of the plurality of documents. For example, the predetermined subject may include one or more general descriptive terms that identify subject matter shared by each of the plurality of documents.

In another embodiment, the plurality of documents may be included within a predetermined grouping. For example, the plurality of documents may be included within a slash tag, where the slash tag groups identifiers of a location of each of the plurality of documents (e.g., hyperlinks, pointers, etc.) within a centralized location. In another example, the slash tag may also include identifiers of one or more of the plurality of documents themselves. In yet another embodiment, the slash tag may include a database, a table, a textual document, or any other data structure or document grouping the plurality of documents. In still another embodiment, the slash tag may be unique to the predetermined subject.

The textual data of each of the plurality of documents can be analyzed to identify one or more categories within the plurality of the documents. In one embodiment, analyzing the textual data for each of the plurality of documents may include performing automatic language detection on the textual data. For example, the textual data may be analyzed in order to determine a language in which the textual data is written. In another embodiment, the textual data may be refined by only including textual data written in a predetermined language as refined textual data.

Also, in one embodiment, analyzing the textual data for each of the plurality of documents may include refining the textual data by removing one or more words from the textual data. For example, the textual data may be stripped of one or more words having a predetermined frequency and a predetermined significance. In another example, one or more predetermined words (e.g., "common" words, plural or verb conjugation endings, etc.) may be removed from the textual data to create the refined textual data.

In addition, in one embodiment, analyzing the textual data for each of the plurality of documents may include refining the textual data by removing any duplicate documents within the plurality of documents. For example, textual data that is determined to be duplicated within the plurality of documents may be removed so that only a single instance of such textual data is included in the refined textual data.

Furthermore, in one embodiment, analyzing the textual data for each of the plurality of documents may include performing a latent dirichlet allocation (LDA) analysis on the refined textual data to identify the one or more categories. For example, performing the LDA analysis on the refined textual data may include transforming the refined textual data into an array (e.g., a bag-of-words array, etc.) and determining the one or more categories from the array.

Further still, in one embodiment, the one or more categories may each include one or more topic vectors, where each topic vector includes one or more identified keywords within the refined textual data as well as a frequency of the one or more keywords within the refined textual data. In another embodiment, the topic vectors may be analyzed to identify textual data that is included in a number of topic vectors that is below a threshold level. In yet another embodiment, topic vectors that include the identified textual data may be removed from the identified topic vectors.

In another embodiment, analyzing the textual data for each of the plurality of documents may include performing any other type of analysis. For example, analyzing the textual data may include performing one or more of natural language subject, object, and predicate extraction.

The one or more categories identified within the plurality of the documents can be returned. In one embodiment, the one or more categories may be linked to the predetermined subject and returned as categories indicative of the predetermined subject. In another embodiment, the one or more categories may be saved in association with the predetermined subject.

Additionally, in one embodiment, the one or more categories may be used to perform classification of additional textual data. For example, additional textual data (e.g., scanned and OCR'd data, web page textual content, etc.) may be compared to the one or more categories to generate a probability that the unprocessed textual data is associated with the predetermined subject linked to the one or more categories. In this way, the one or more categories identified within the plurality of the documents may be used to classify unprocessed textual data.

A plurality of documents associated with the subjects can be gathered. In one embodiment, the plurality of documents may be web based or non-web based. For example, as part of providing a search index of the Internet, one or more systems may be configured to crawl the Internet searching for web pages, and extracting text, or a subset of web pages and a subset of text. Such an example corpus of text may be indexed for fast quality searches, but also all the extracted text may be saved for later use. In another example, the dataset, which may include any amount of information, for example a petabyte of information, may be stored in a data storage. In another embodiment, a database (e.g., a nosql database system, etc.) may provide scalable rapid access as needed.

Additionally, in one embodiment, the predetermined subject may include a slash tag, and the plurality of documents may be gathered in association with the slash tag. In another embodiment, slash tags may include test tags, admin tags, tags created for certain business partners for specific uses, group tags for managing other tags, etc. In yet another embodiment, one or more document sets may be built for each of these slash tags through any of various ways, including using expert librarians to determine websites of high quality on each slash tag subject.

Further, in one embodiment, identified pages may have supplementary information like user lists on a web forum, or mailing addresses, or legal agreements. In another embodiment, a predetermined portion of the data in a slash tag's document set may be about the underlying subject. In this way, getting the most probable sets of topics is diagnostic of a subject, even if not all the training data is pure. In yet another embodiment, separate text extraction jobs for each of these slash tags may run over the nosql database, to extract text for each given subject.

Once the raw extracted text is gathered, it may then be processed for analysis. In one embodiment, as part of the gathering of text, before saving it to local disk, automatic language detection may be performed. For example, this may be performed using one or more methodologies. For instance, an open source chromium compact language detection library (CLD) may be utilized to determine the language of the text.

Also, in one embodiment, only documents written in a predetermined language (e.g., English-text documents, etc.) may be saved. In another embodiment, processing the text may include stripping the text of all words that have no significance in classifying the text. Such words may be referred to as stop words, which, for example, may be words found at a high frequency such as, "a" and "the." If left in, the LDA analysis may have these words as strong in all topic vectors produced, which would mean that the words may have no significance in classifying the text.

In addition, in one embodiment, because certain aspects may be used to develop an automatic way to determine words that are diagnostic of a subject, small common words that form the grammar of the language may not be diagnostic of any particular subject. Thus, in another embodiment, these stop words may be stripped from the text to increase the significance of the remaining words for classification.

Furthermore, in one embodiment, processing the text may include stemming one or more words within the text by removing plural or verb conjugation endings. For example, words with separate ends may be analyzed with the same significance. This may be performed using a Lingua::Stem:: En module for perl for example. In another embodiment, processing the text may include checking all documents within each subject to remove duplicate documents so the system saves only unique documents. In another embodiment, the order of these documents may then be randomized, and the set may be divided into training and test data with an 80/20 split, for example.

A latent dirichlet allocation (LDA) analysis can be performed on the processed text to identify a plurality of topic vectors indicative of the predetermined subjects. In one embodiment, the processed text may include the gathered documents from the curated slash tag. In this way, the documents may be used to provide a distinct corpus for the predetermined subjects covered by the slash tag. In another embodiment, each distinct corpus may be analyzed to determine one or more topic vectors within the corpus using LDA analysis.

Further still, in one embodiment, a number of topic vectors may be based on a number of documents associated with the processed text. For example, a number of topic vectors to use for analysis may be equal to the square root of half of the number of documents. In another embodiment, the LDA analysis may be performed using a Gensim library for python.

Also, in one embodiment, performing the LDA analysis may include reading in and splitting up documents into text words, where only words that existed in two or more documents may be analyzed. In another embodiment, performing the LDA analysis may include producing a dictionary of these words, which may provide a unique integer for each word. In another embodiment, performing the LDA analysis may include converting the one or more documents into a bag-of-words array, where only the word, represented as an integer, and the number of times it was used is saved. These bag-of-word arrays may then be analyzed using LDA to find the resulting topic vectors.

Additionally, in one embodiment, the LDA analysis may be performed separately for each subject, correlating to the number of slash tags utilized in the example. In another embodiment, the production may be managed on computer clusters. In yet another embodiment, each example job may produce a set of unit topic vectors, with words (as integers) and frequencies.

Further, in one embodiment, to reduce an effect of spam, the topic vectors may be analyzed, such that if one topic vector is determined to use words that are rarely used in other topic vectors, then it is labeled as a bad topic label. In another embodiment, documents containing a predetermined number of words included within vectors having a bad topic label may be removed from the corpus of documents. The LDA analysis may then be repeated, without these removed documents.

The data, slash tags and information may be updated and refined. For example, a subject may be removed if a number of topic vectors identified therein are below a threshold value and/or if usage of the subject is below a threshold. In another embodiment, the processing and analysis of document text may be repeated periodically as the data set changes.

In one embodiment, after a complete set of topic vectors are produced, the set of vectors may be used for subject classification. For example, text may be processed and then compared to these topic vectors to generate probabilities as to what slash-tag (subject) set it may be in.

Additionally, in one embodiment, the topic vectors may be limited to only words that have a certain strength, for example, of more than 0.01. Any words with a strength less than the predetermined strength in a topic vector may be ignored. A dictionary may be produced with all words from all topic vectors of all subjects, and saved, to provide a unique mapping of words used to integers.

Further, in one embodiment, any unclassified text may be processed in the same way as the text was analyzed, with the removal of stop words and stemming. Then the words may be turned into integers using the dictionary, any words not in the dictionary may be ignored. In certain examples, the unclassified text may then be turned into a bag-of-words, including integers and the number of times the integers occur in a given document. This bag of words may then be turned into a unit vector, where all the occurrences are normalized to the overall length.

Further still, in one embodiment, the unit vector may be compared to all the produced topic vectors by taking the dot product of the two, where the dot product is an algebraic operation that takes two numbers of equal length and returns a single number. All the dot products for all vectors in a given subject may then be summed to provide a strength score for that subject for the given text.

For example, in any subject there may be many topic vectors and for most of these vectors the dot product will be close to zero, even if the given text is about that subject. Since there are some subjects with hundreds of topic vectors, there may be hundreds of small dot products that may provide a significant score even when they are close to zero. In another embodiment, discrimination may be applied where any dot product that has a value less than a certain threshold (e.g., 0.2, etc.) is ignored and only stronger dot products above the threshold are summed for the score. In another embodiment, this threshold may be empirically verified against the test set, to provide a better classification to subject.

Also, in one embodiment, a number of topics may be widely different, with some subjects having orders of magnitude less topic vectors than others. Such an example scoring may not be equal given the differences in numbers. A linear scaling on the score based on the number of topic vectors may be applied, which may reduce the score of the largest subject. In some examples the reduction may be up to 30%. This may provide a fairness correction to the score, which may help in the classification.

In addition, in exemplary test examples, once all scores are calculated for all the subjects, then these scores may be sorted, and the most probable subjects may be returned, which may provide an array of subjects and strengths. In another embodiment, hashes may be used to store the topic vectors to provide a simple lookup of words and strengths in the code.

Further, in one embodiment, one or more topic vectors may be changed from hashes of words and strengths to an ordered byte stream (e.g., an ordered byte stream of 4-byte integers, etc.) with another array of strengths (e.g., 4-byte floating-point strengths, etc.). These may then be accessed as arrays in a complied c routine, and may be cached in high performance memory. This may change the classification time from a few seconds each, to a little less than a tenth of a second to classify each document.

In one embodiment, a large set of web sites linked to slash tags may be created, where the slash tags include defined subjects of high quality data. These websites may represent a small percentage of data available on the Internet, but may provide a high quality set of text for each defined subject. Text from these high quality websites may be processed by computer systems using Latent Dirichlet Allocation (LDA) analysis to determine sets of topics for each subject. These sets of topics may then be used to classify any text, to determine an array of most probable subjects. In this way, the previously uncategorized sources of text may be analyzed and categorized by subject automatically, which may improve a number of uses such as indexing, data matching, and searching.

In another embodiment, natural language processing (NLP) and matrix inversion of the word space to the document space may be used to reduce the complexity of the natural text. With the wide availability of large scale computing power, larger and larger set of documents may be used, and the complexity may be reduced such that general information about the text may be determined.

One technique that may be used for data reduction is Latent Dirichlet Allocation (LDA), where for a set of documents a set of topics is assumed and for each topic a set of words and strengths is assumed. Then, using a Bayesian analysis, the most probable sets of words for the topics may be calculated. These topics may be related sets of words that appear repeatedly, most probably at the frequencies calculated. In this way, the space of words and documents may be reduced to a space of most common topics, to provide an easier way of handling and calculating general information for a set of documents. Thus, for example, topics may be distributions over words. And we can assign to documents, or sets of documents, a distribution over these topics.

In one embodiment, the space of topic vectors may provide a simplified analysis of documents, which may provide some ability to classify text, and see changing topics over time. In another embodiment, topic vectors may be grouped into subjects, to further reduce the data. For example, a set of topics may be labeled as a certain subject, and then the text may be discussed as an even smaller set of data. This reduction may determine a general subject of a set of documents to see if it can be of use to a general audience.

In another embodiment, slash tags may be defined for a set of subjects that divide up information on the Internet, defining high quality sources of text. In yet another embodiment, one or more users may include searches on data that is only labeled with a particular slash tag. Results may then only look for web pages based on the subject defined by the slash tag, for example, sports, history, fashion, or any of various others.

It should be noted that divisions of data and/or classification systems such as slash tags are used in an exemplary fashion and are not intended to be limiting. Any of various divisions of data and/or classification systems may be used. In one example, by using slash tags to search, the set of slash tag data may provide a corpus of a large amount of text, which may be labeled with a certain subject. In another example, training data, which has been labeled, may be used for analysis. Using LDA, sets of topic vectors may then be found, which may be related to a certain subject. These sets then may be used to provide classification of any random text, as to what are the most probable subjects that are relevant to that text.

The system can save the resulting lists of classified subjects gathered from the analysis of the plurality of documents and save the difference values between each subject into a distance matrix 101. In an embodiment, the system can discard subjects if those subjects fail to meet a predetermined relevance threshold, in order to cull extraneous results. The list of subjects can have relevance values listed, which can be normalized to 1.0 for the most relevant subject in the list.

The ordered list of subjects returned in the classification can be used to determine the distance between the subjects. Using each ordered list, the difference between each subject returned can be saved in a table of running averages for the distances between each pair of subjects 102. In order to cull non-relevant subjects, the system can disregard difference matrix elements if less than a pre-determined number of documents contain references to the two particular subjects in the list of subjects originally returned by the ingestion operation. These distance elements can be set with a null value in order to remove them from the difference matrix 103.

The resulting distance matrix can be used to increase the amount of relevant data returned based on one or more "close" subjects 104. Thus, the system can apply natural language processing to a set of subjects, wherein for each of the set of subjects there are one or more documents that have been analyzed for one or more topics relevant to the particular subject having the one or more documents. Using the statistical model described above (for example, LDA), a relevance strength can be assigned to each topic to form a topic vector matrix. Using the topic vector values, the system can build a distance matrix between adjacent subjects to determine their semantic distance.

Figure 2:
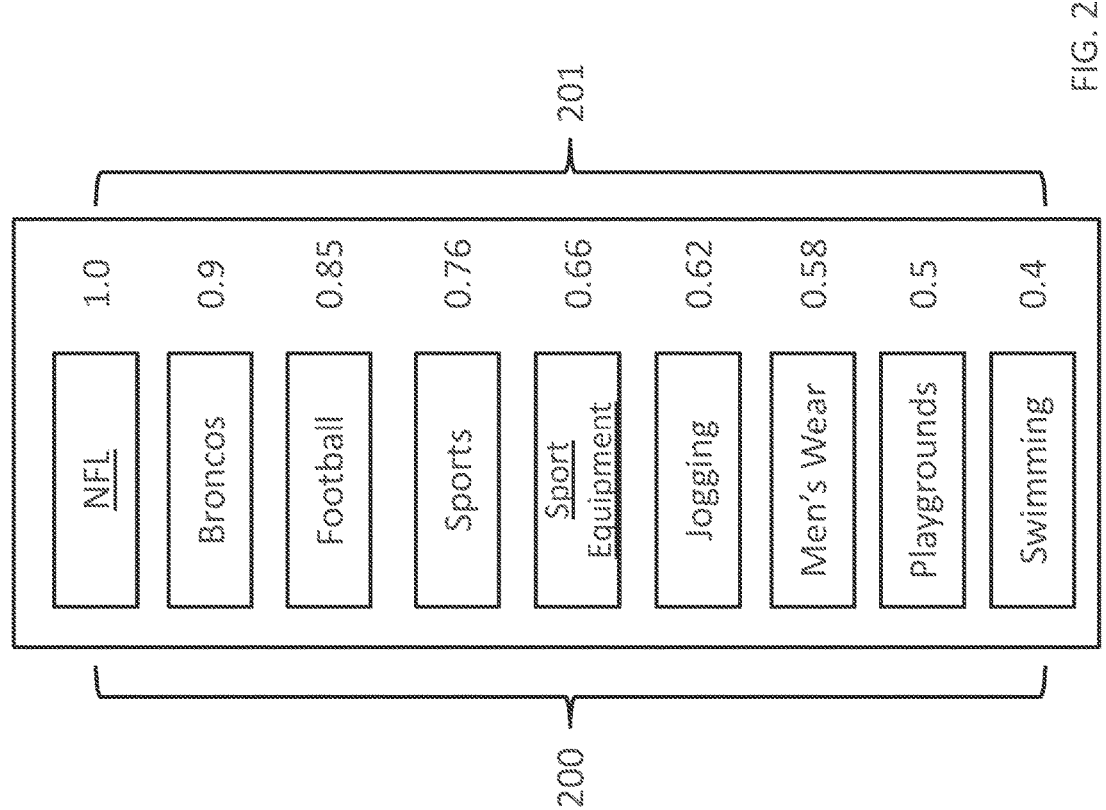
FIG. 2 depicts an example classification list used by a semantic distance calculation system, according to embodiments described herein.

FIG. 2 illustrates an example classification of a document using the semantic distance calculation system as described herein. In an embodiment, the document's ostensible subject matter relates to a popular National Football League (NFL) team. The system creates a classification schema having one or more subjects 200, which, based on the natural language analysis of the documents in question, return a series of normalized relevance values 201, which are then ranked. The distance between subjects can then be measured. For example, the distance between the primary subject, "NFL," and "Sports Equipment" is approximately three subjects, a value which can then be input into the resultant subject distance matrix. In an embodiment, subjects may be excluded from the classification list if they fail to reach a pre-determined relevance threshold. In an embodiment, the relevance threshold can be 0.2.

The creation of classifications as shown in FIG. 2 can be repeated for a large set of documents in order to build a comprehensive distance matrix. With a large set of documents, distance matrix elements can be secondarily filtered by relevance by a meta-analysis of subject appearance, in order to limit the size of the "related" subject distance matrices.

Figure 3:
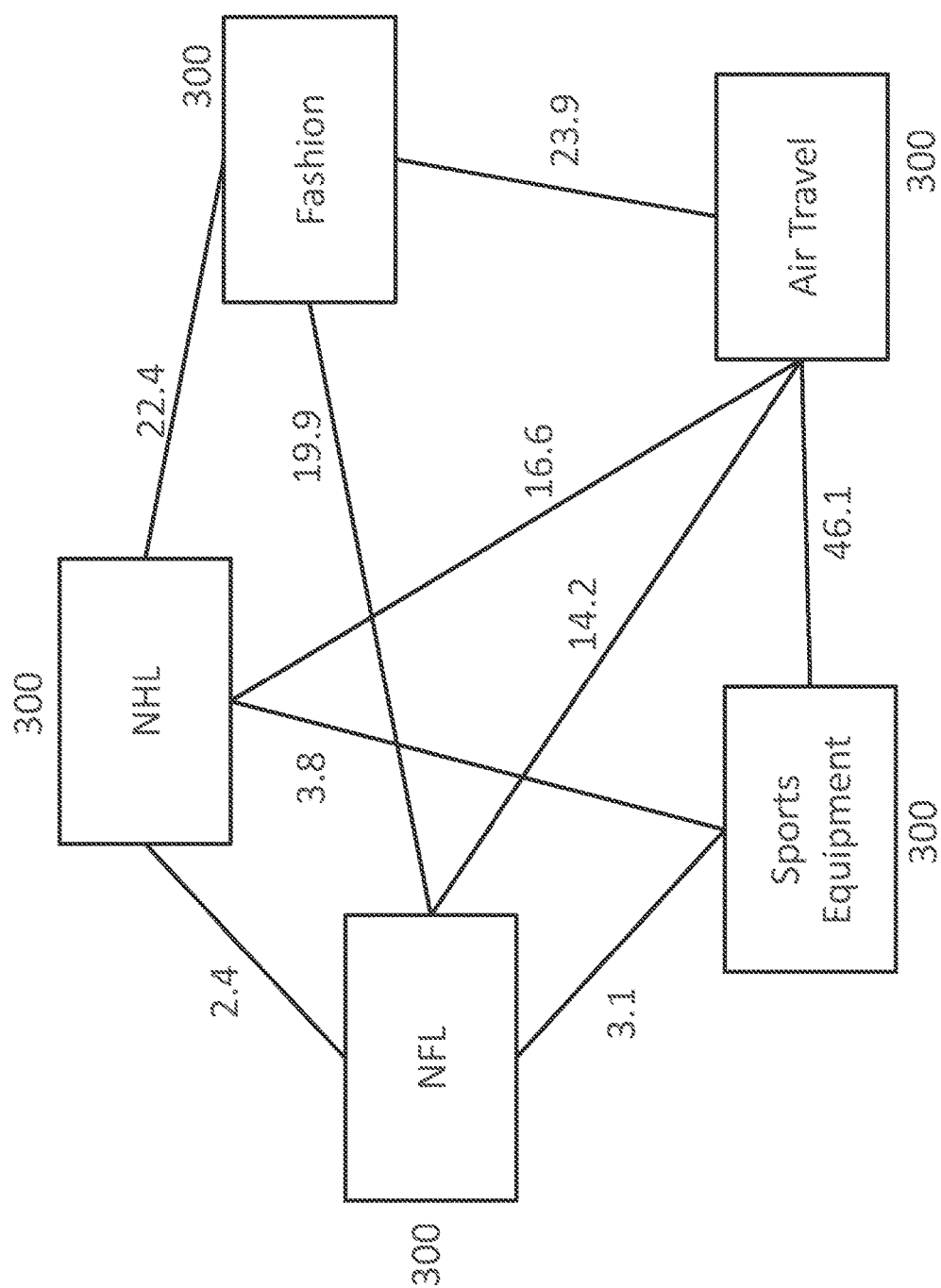
FIG. 3 depicts an example of a semantic distance calculation, according to embodiments described herein.

FIG. 3 illustrates an example distance matrix between general subjects in a reduced space. Each general subject 300 has a relational distance between its adjacent subject, which is a measure of the two subjects' relational distances to one another. For example, while "NFL" and "Sports Equipment" have a relational distance of 3.1, the relational distance between "NFL" and "Fashion" is 19.9, while the distance between "NFL" and "Air Travel" is 14.2. In an embodiment, the larger the relational distance value, the greater number of subjects between the two subjects examined, and the greater the semantic distance between those subjects.

The "closeness" of the subjects can be used to increase the usefulness of a larger subject classification system or search system by providing the larger system with a comprehensive listing of relational subjects, which can aid the larger system in targeting and training during document ingestion. By relating subjects on a semantic distance scale, search results can be pulled from primary subjects and their related subjects, where related subjects can be defined by a preset semantic distance. Using the examples from FIGS. 2 and 3, a search using terms germane to football would be filtered based on the relational distance matrix, and results would be returned in an order indicative of the relational distance between the subjects. In other words, a user would be more likely to get search results concerning sports equipment than they would be to get search results having to do with fashion.

Figure 4:
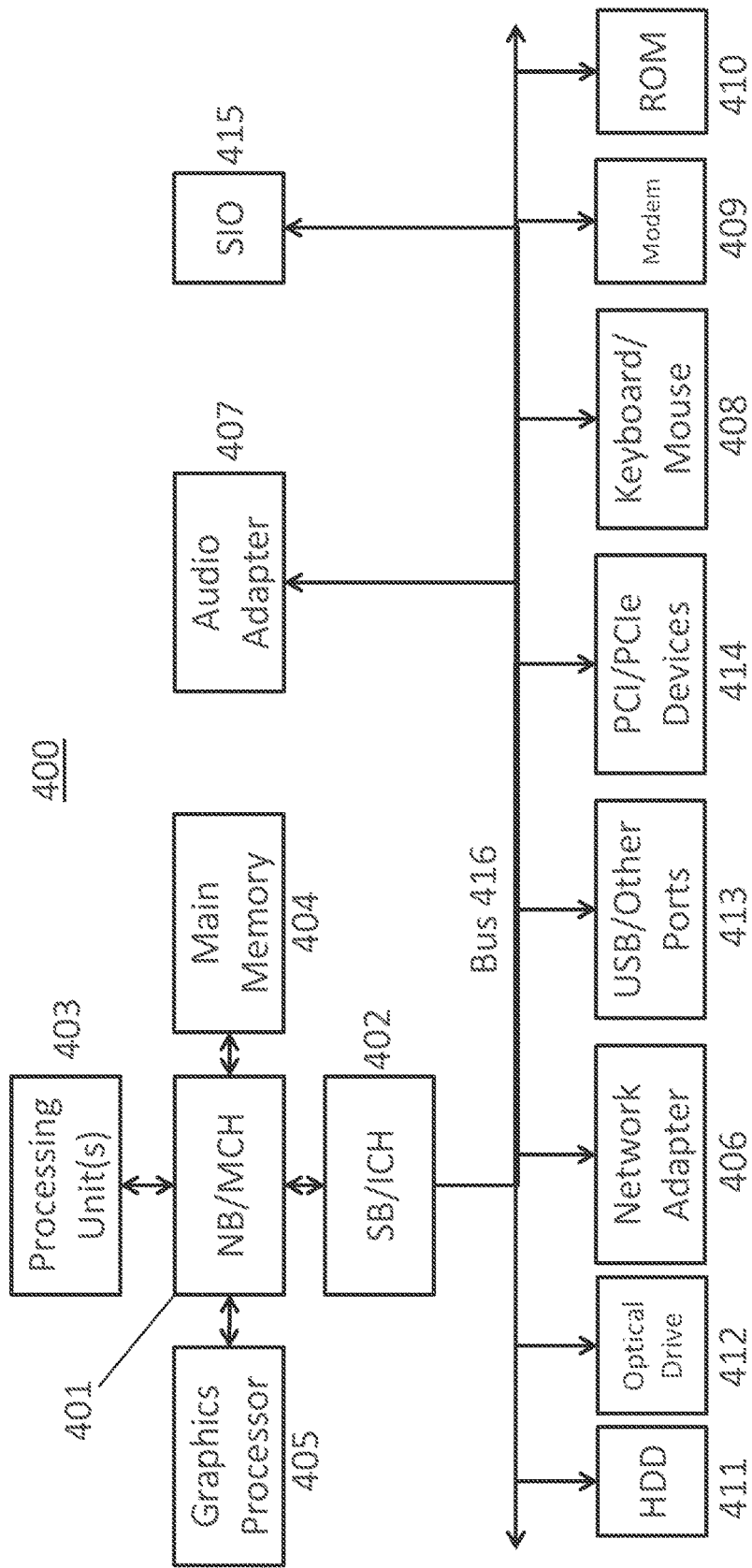
FIG. 4 is a block diagram of an example data processing system in which aspects of the illustrative embodiments may be implemented.

FIG. 4 is a block diagram of an example data processing system 400 in which aspects of the illustrative embodiments can be implemented. Data processing system 400 is an example of a computer, such as a server or client, in which computer usable code or instructions implementing the process for illustrative embodiments of the present invention are located. In one embodiment, FIG. 4 represents a server computing device, such as a server, which implements the semantic distance calculation system described herein.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System P® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the semantic distance calculation system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement a system for calculating semantic distances between subjects using a natural language processing technique, the method comprising:
    ingesting a plurality of documents;
    extracting a set of subjects from the plurality of documents using latent dirichlet allocation, wherein the latent dirichlet allocation identifies a plurality of topic vectors indicative of the set of subjects, and each word in the plurality of topic vectors has a strength more than 0.01;
    for each document in the plurality of documents, generating a classification list comprising a ranking of the one or more subjects based on a relevance of each subject to the document;
    for each classification list, calculating a semantic distance between each subject present on the classification list;
    aggregating a plurality of classification lists;
    creating a distance matrix containing a relative semantic distance between each member of the set of subjects; and
    disregarding one or more distance matrix elements if the distance matrix elements do not appear in a predetermined threshold amount of documents contained in the plurality of documents.

2. The computer implemented method as recited in claim 1, further comprising:
    excluding one or more subjects from the classification list if the subjects fail to reach a predetermined relevance threshold.

3. The computer implemented method as recited in claim 1, further comprising:
    for each classification list, normalizing a relevance value for each subject on the classification list based on a primary subject.

4. The computer implemented method as recited in claim 1, further comprising:
    for each subject, extrapolating the subject into one or more topic vectors; and
    calculating the relevance of the subject through analyzing the one or more topic vectors against the plurality of documents.

5. The computer implemented method as recited in claim 1, further comprising:
    randomizing an order of the plurality of documents prior to ingestion.

6. A computer program product for calculating semantic distances between subjects using a natural language processing technique, the computer program product comprising a computer readable storage medium having program instructions embodied therewith, the program instructions executable by a processor to cause the processor to:
    ingest a plurality of documents;
    extract a set of subjects from the plurality of documents using latent dirichlet allocation, wherein the latent dirichlet allocation identifies a plurality of topic vectors indicative of the set of subjects, and each word in the plurality of topic vectors has a strength more than 0.01;
    for each document in the plurality of documents, generate a classification list comprising a ranking of the one or more subjects based on a relevance of each subject to the document;
    for each classification list, calculate a semantic distance between each subject present on the classification list;
    aggregate a plurality of classification lists;
    create a distance matrix containing a relative semantic distance between each member of the set of subjects; and
    disregard one or more distance matrix elements if the distance matrix elements do not appear in a predetermined threshold amount of documents contained in the plurality of documents.

7. The computer program product as recited in claim 6, the processor further configured to:
    exclude one or more subjects from the classification list if the subjects fail to reach a predetermined relevance threshold.

8. The computer program product as recited in claim 6, the processor further configured to:
    for each classification list, normalize a relevance value for each subject on the classification list based on a primary subject.

9. The computer program product as recited in claim 6, the processor further configured to:
    for each subject, extrapolate the subject into one or more topic vectors; and
    calculate the relevance of the subject through analyzing the one or more topic vectors against the plurality of documents.

10. The computer program product as recited in claim 6, the processor further configured to:
    randomize an order of the plurality of documents prior to ingestion.

11. A system for calculating semantic distances between subjects using a natural language processing technique, comprising:
    a semantic distance calculation processor configured to:
    ingest a plurality of documents;
    extract a set of subjects from the plurality of documents using latent dirichlet allocation, wherein the latent dirichlet allocation identifies a plurality of topic vectors indicative of the set of subjects, and each word in the plurality of topic vectors has a strength more than 0.01;

for each document in the plurality of documents, generate a classification list comprising a ranking of the one or more subjects based on a relevance of each subject to the document;

for each classification list, calculate a semantic distance between each subject present on the classification list;

aggregate a plurality of classification lists;

create a distance matrix containing a relative semantic distance between each member of the set of subjects; and disregard one or more distance matrix elements if the distance matrix elements do not appear in a predetermined threshold amount of documents contained in the plurality of documents.

12. The system as recited in claim 11, the semantic distance calculation processor further configured to:

exclude one or more subjects from the classification list if the subjects fail to reach a predetermined relevance threshold.

13. The system as recited in claim 11, the semantic distance calculation processor further configured to:

for each classification list, normalize a relevance value for each subject on the classification list based on a primary subject.

14. The system as recited in claim 11, the semantic distance calculation processor further configured to:

for each subject, extrapolate the subject into one or more topic vectors; and calculate the relevance of the subject through analyzing the one or more topic vectors against the plurality of documents.

15. The system as recited in claim 11, the semantic distance calculation processor further configured to:

randomize an order of the plurality of documents prior to ingestion.

* * * * *